United States Patent [19]

Kuki et al.

[11] 4,167,701

[45] Sep. 11, 1979

[54] DECODER FOR ERROR-CORRECTING CODE DATA

[75] Inventors: Takakuni Kuki; Hiroyuki Tatsumi, both of Tokyo, Japan

[73] Assignee: Nippon Electric Company, Ltd., Tokyo, Japan

[21] Appl. No.: 844,942

[22] Filed: Oct. 25, 1977

[30] Foreign Application Priority Data

Oct. 25, 1976 [JP] Japan ................................ 51/128092

[51] Int. Cl.² ............................................ H03K 13/32
[52] U.S. Cl. ............................ 325/41; 340/146.1 A X
[58] Field of Search ............ 340/146.1 R, 146.1 A X; 179/15 AE; 325/41, 42, 65, 323, 324, 473

[56] References Cited

U.S. PATENT DOCUMENTS

| 3,506,961 | 4/1970 | Abramson et al. ....... 340/146.1 A X |
| 4,032,884 | 6/1977 | Gutleber ..................... 340/146.1 A X |

Primary Examiner—Benedict V. Safourek
Attorney, Agent, or Firm—Sughrue, Rothwell, Mion, Zinn and Macpeak

[57] ABSTRACT

An error correcting decoder is disclosed which blocks correction of bits received during periods of relatively high signal intensity levels. A syndrome register and decision circuit provide error correcting bits for all bits which the sequence of input data determines to be in error. But only those data bits which occur during low levels of signal intensity are corrected.

4 Claims, 1 Drawing Figure

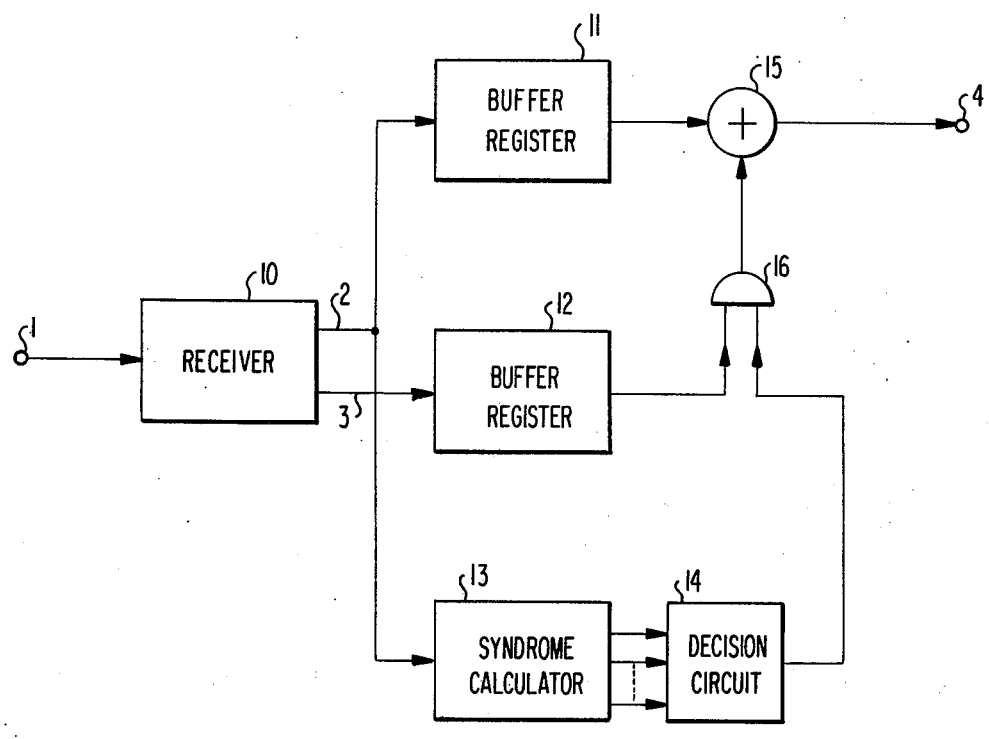

DECODER FOR ERROR-CORRECTING CODE DATA

BACKGROUND OF THE INVENTION

The present invention relates to a decoder for decoding a radio frequency carrier wave modulated with data encoded according to an error-correcting coding system.

In a wireless communication path wherein signals are subject to fading, code errors are concentrated in the period of lowered electric field intensity of the received signal. So long as the electric field intensity is high, code errors do not occur. However, the conventional error-correcting code decoders (Reference is made, for instance, to the article by R. T. Chien, et al., entitled "Error Correction in a Radio-Based Data Communications System", published in the IEEE Transactions on Communications, pages 458–462, April 1975) have the disadvantage that due to an error bit having occurred during the period of the lowered field intensity, a bit received during the period of adequate electric field intensity tends to cause an erroneous correction.

SUMMARY OF THE INVENTION

It is therefore an object of the present invention to provide a decoder that is free from the aforementioned disadvantage.

According to one feature of the present invention there is provided a novel decoder in which bits received during the period of adequate electric field intensity of the received wave are not corrected while only those received during the period of lowered field intensity are corrected thereby to avoid the erroneous code correction.

BRIEF DESCRIPTION OF THE DRAWINGS

The sole drawing is a block diagram showing one preferred embodiment of the decoder according to the present invention.

DETAILED DESCRIPTION OF THE PREFERRED EMBODIMENTS

In the drawing, reference numeral 10 designates a receiver (which may be constituted of receiver 400 described in U.S. Pat. No. 3,613,004); 11 and 12, buffer registers; 13, a syndrome calculator; 14, a decision circuit; 15, an adder; and 16, an AND gate. The receiver 10 comprises an RF amplifier 100, a mixer 101, a local oscillator 102, an IF amplifier 103, a limiter 104, a discriminator 105, an amplifier 106, and a noise intensity or electric field intensity detector 107 (including an amplifier 110 and a rectifier 111). An r.f. carrier wave modulated by error-correcting-coded data signal is applied to an input terminal 1. The modulated carrier wave is demodulated into a digital signal in the discriminator 105. The digital signal is fed via output 2 to the buffer register 11, which may, for example, be a shift register, and the syndrome calculator 13. Output 3 of a receiving electric field intensity detector circuit (which may be composed of a rectifier circuit and a voltage comparator) included in the receiver 10 emits an output signal "0" or "1" depending on whether the field intensity is higher or lower than a preset value. The electric field intensity detector output is fed to the buffer register 12 which has the same number of stages as the buffer register 11. The methods for detecting the received electric field intensity may include the generally known method of detecting a rectified output of a carrier wave or detecting a noise output obtained after the demodulation of an r.f. signal. In the former case, the detector circuit is connected, for example, to the output of the intermediate amplifier 440 appearing in FIG. 4 of U.S. Pat. No. 3,613,004. In the latter case, the detector circuit is equivalent to the noise amplifier 610 and the noise rectifier 620 in FIG. 4 of the same U.S. patent.

As is well known, when the output of the syndrome calculator 13 is judged by the decision circuit 14 as indicating an error in the received data the decision circuit 14 emits an output signal "1" at the moment when the erroneous part of the received data appears at the output of buffer register 11. At the same time, if the received bit judged to be erroneous by the decision circuit 14 is a bit received during the period of the lowered electric field intensity, then the output signal from the buffer register 12 is "1", so that the output of the AND-gate 16 is turned to "1", and thus the output signal from the buffer register 11 is inverted by the adder 15 (for instance, an Exclusive-OR gate or a Modulo-2 adder) to be subjected to error correction, and thereafter it is led to an output 4. Whereas, if the received bit judged to be erroneous by the decision circuit 14 is a bit received during the period of adequate field intensity, then the output signal from the buffer register 12 is "0" at the moment when the decision circuit provided the output signal "1", so that the output of the AND-gate 16 is turned to "0". Thus, the output signal from the buffer register 11 is emitted from the output 4 without being inverted. Consequently, a correct bit received during the period of adequate field intensity if never corrected due to errors having occurred in the preceding and/or following bits. This feature is important especially in an r.f. communication path having abrupt electric field intensity variations. Thus, the present invention contributes to the lowering of the bit error rate. For details of the syndrome calculator 13 and the decision circuit 14, reference is made to the following literature:

W. W. Peterson: "ERROR-CORRECTING CODES", M.I.T. Press March, 1962, pages 183–199.

What is claimed is:

1. An error-correcting code decoder for decoding data from a radio frequency carrier wave modulated with data encoded according to an error-correcting code system, characterized in that said decoder comprises demodulator means for demodulating said data from said carrier wave, first means for detecting the level of electric field intensity of said carrier wave, means for correcting errors in said demodulated data, second means responsive to a predetermined detected level of electric field intensity for blocking the output of said error correction means, and a Modulo-2 adder connected to said demodulator means and said gating means for providing the summation of the output of said demodulator mean and said gating means.

2. An error-correcting decoder for decoding data from a radio frequency carrier wave modulated with data encoded according to an error-correcting code, said decoder being of the type having, means responsive to said radio frequency carrier wave for demodulating the data on said carrier wave, error correcting means responsive to said demodulated data for providing an error correcting output bit stream in time coincidence with the bits of said demodulated data for which said error correcting means detects errors, and combining means responsive to said output bit stream and said demodulated data for correcting said demodulated data bits in time coincidence with said output bit stream, the improvement comprising means for detecting the instantaneous level of intensity of radio frequency signals being received by said error-correcting decoder, and means responsive to a detected instantaneous level above a predetermined level for blocking application of said output bit stream to said combining means.

3. An error-correcting decoder as claimed in claim 2 wherein said combining means is a Modulo-2 adder, and said blocking means is a gate having said output bit stream as one input thereto, said detecting means including means for providing a output bit sequence, the value of each bit representing said instantaneous level, said output bit sequence being connected to an input of said gate to control the passage therethrough of said output bit stream, said Modulo-2 adder having said demodulated data connected to one input thereto and the output from said gate connected to the other input thereof.

4. An error-correcting decoder as claimed in claim 3 further comprising a first buffer register for temporarily storing said demodulated data and providing said demodulated data to said Modulo-2 adder, and a second buffer register for temporarily storing said bit sequence and providing said bit sequence to said gate.

* * * * *